Figure 1:
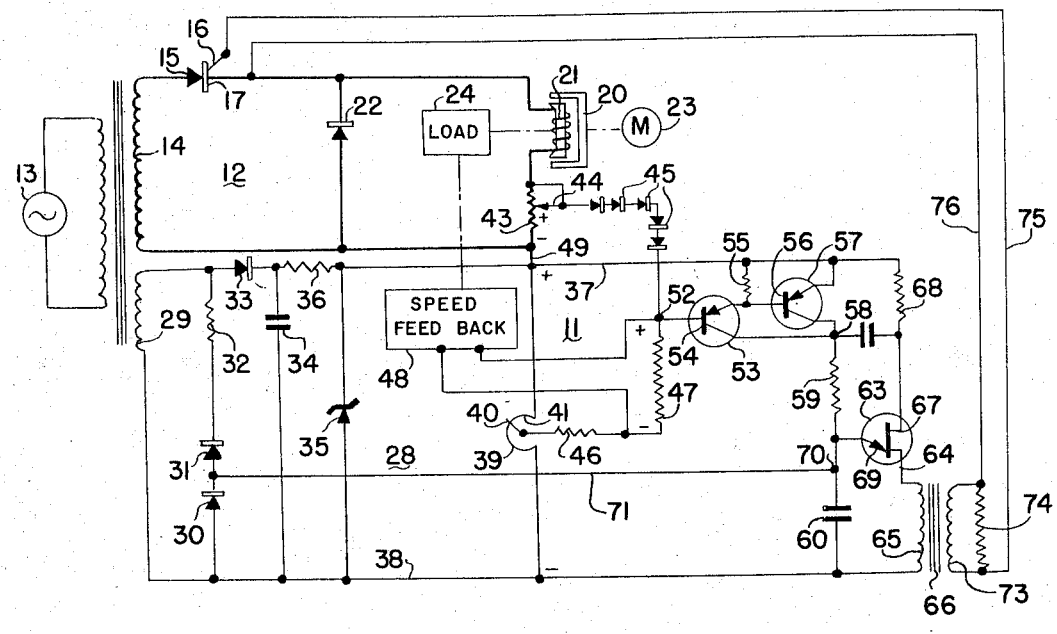

Dec. 20, 1966  J. R. ZELLER  3,293,465

CURRENT LIMIT CIRCUIT

Filed Jan. 7, 1963

INVENTOR.
JOHN R. ZELLER
BY *Woodling, Krost,*
*Granger and Rust,*
ATTORNEYS

United States Patent Office 3,293,465
Patented Dec. 20, 1966

3,293,465
CURRENT LIMIT CIRCUIT
John R. Zeller, Cleveland Heights, Ohio, assignor to Reliance Electric and Engineering Co., a corporation of Ohio
Filed Jan. 7, 1963, Ser. No. 249,840
12 Claims. (Cl. 310—94)

The invention relates in general to current limit circuits and, more particularly, to current limit circuits used with control systems for eddy current clutch energization circuits.

The invention is used as a protective circuit for preventing overload current conditions on an electrical load as well as the energization circuit for this load. The invention may be incorporated in a dynamoelectric machine such as an eddy current clutch control circuit wherein current limit impedance is connected in series with the eddy current clutch field coil for developing a current limit voltage signal. Means is provided to variably energize the field coil, as the electrical load, through the impedance, and means is provided to establish a control voltage with means to increase the energization to the clutch field coil upon increased control voltage. At least one diode rectifier is connected in a loop circuit means which connects the control voltage in series with the current limit voltage signal and with the diode rectifier being poled to conduct current in a direction for a voltage drop opposing said control voltage. The diode rectifier conducts upon the voltage applied thereto from the loop circuit means exceeding the forward voltage drop of the diode rectifier to cause current flow through the loop circuit means to effectively decrease the control voltage and thus limit the energization to the eddy current clutch coil.

An object of the invention is to provide a current limit control circuit controlled by the forward voltage drop of one or a plurality of series connected diode rectifiers.

Another object of the invention is to provide a current limit feature in a semi-conductor control circuit for an eddy current clutch with the current limit circuit protecting both the eddy current clutch coil and the semi-conductor controlled rectifier supplying energization to the coil.

Another object of the invention is to provide a current limit circuit wherein a loop circuit means is provided with voltages algebraically added around the loop circuit and with this loop circuit including series connected diode rectifiers to conduct current in the forward direction upon excessive voltage applied thereto and with this conducted current effective to limit the energization to an electrical load.

Another object of the invention is to provide a current limit circuit as a part of a loop circuit means also including series connected diode rectifiers to conduct current upon excessive voltage applied thereto in the forward direction and with a portion of the voltage from this loop circuit means used to control energization to an electrical load.

Another object of the invention is to provide a controlled rectifier circuit with a current limit feature wherein the control of the controlled rectifier has high gain for fast response yet the current through the controlled rectifier is prevented from exceeding a pre-set limit.

Figure 2:
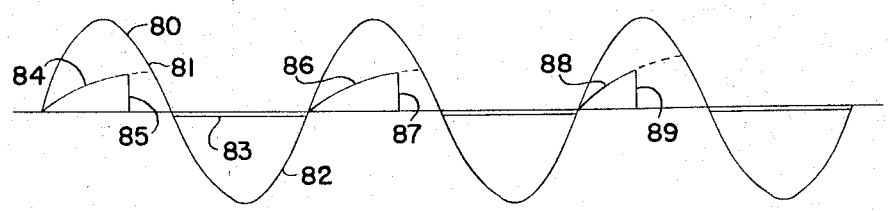

Other objects and a fuller understanding of this invention may be had by referring to the following description and claims, taken in conjunction with the accompanying drawings, in which:

FIGURE 1 is a schematic diagram of an eddy current clutch control circuit embodying the current limit circuit of the invention; and, FIGURE 2 is a graph of voltage vs. time.

FIGURE 1 shows schematically a current limit circuit 11 to control the current in an eddy current clutch energization circuit 12. The circuit 12 is energized from an alternating voltage source 13 through a transformer secondary 14 and a controlled rectifier 15. This controlled rectifier may be a semi-conductor such as a silicon controlled rectifier having a gate 16 and a cathode 17. An eddy current clutch 20 has a clutch field coil 21 as the electrical load for this energization circuit 12 as energized through the controlled rectifier 15. A back rectifier 22 permits current flow through the clutch coil 21 during negative half cycles on the anode of the controlled rectifier 15. A motor 23 is shown as driving a mechanical load 24 through the eddy current clutch 20 at veriable speeds depending upon energization of the field coil 21.

The current limit circuit 11 is part of a control circuit 28 controlling the controlled rectifier 15. This control circuit is energized from the alternating voltage source 13 through a transformer secondary 29. Diode rectifiers 30 and 31 are connected in series with a resistor 32 across the secondary 29. The upper end of the secondaries 14 and 29 are instantaneously of the same polarity. The two rectifiers 30 and 31 are poled in the same direction to conduct current on the negative half cycles, namely, the half cycles of the voltage source 13 wherein a negative voltage is applied to the anode of the controlled rectifier 15. This will be during the non-conductive half cycles of this controlled rectifier 15. A direct current voltage source is obtained in any convenient manner and the control circuit 28 accomplishes this by a rectifier 33 and filter capacitor 34 connected across the transformer secondary 29. A Zener diode 35 and a resistor 36 establish a substantially fixed direct current voltage on conductors 37 and 38 with conductor 37 being positive relative to conductor 38. A potentiometer 39 is connected across the conductors 37 and 38 and has a movable blade 40 which picks off a direct current reference voltage on the upper section 41 of this potentiometer.

A current limit impedance 43 is shown as a variable resistor and is connected in series with the clutch field coil 21. A movable blade 44 picks off a predetermined amount of this current limit resistor 43 to establish a current limit voltage signal which is positive at the movable blade 44 relative to the lower end of this resistor 43. The current limit circuit 11 includes a loop circuit or circuit means which includes the reference voltage which is the upper section 41 of the potentiometer 39 and also includes this current limit voltage signal. A plurality of series connected diode rectifiers 45, shown as being five in number, are connected in this loop circuit as is impedance means including a resistor 46 and a feedback impedance 47. The resistor 46 and feedback impedance 47 may be considered as impedance means across at least a part of which is developed a feedback voltage. This feedback voltage is shown as being developed across the feedback impedance 47 from a speed feedback device 48 driven from the mechanical load 24. The negative terminals of the reference voltage 41 and the feedback impedance 47 are connected together by means of the resistor 46. A conductor 49 connects the power circuit or clutch energization circuit 12 to the control circuit 28 and forms a part of the loop circuit which includes the reference voltage 41, the current limit impedance 43, the diode rectifiers 45, the feedback impedance 47 and resistor 46.

The feedback impedance 47 has a positive terminal 52 and, accordingly, the difference in voltage between conductor 37 and terminal 52 is an error signal which effectively is the difference between the reference voltage 41 and the feedback voltage across feedback impedance 47. This error signal is applied as a control voltage to an amplifier circuit which includes a transistor 53. This control voltage is applied as a negative voltage to the base 54 of this transistor 53 and the positive voltage is applied through a resistor 55 to the emitter of the transistor 53. The resistor 55 is also connected to the base 56 of a transistor 57 and the collectors of both transistors are connected to a terminal 58. This terminal 58 is an output terminal of the amplifying circuit and applies amplified current through a resistor 59 and capacitor 60 to charge this capacitor. A unijunction transistor 63 has a base-one 64 connected through a primary 65 of a pulse transformer 66 to the coductor 38. This unijunction transistor has a base-two 67 connected through a resistor 68 to the conductor 37. An emitter 69 of the unijunction transistor 63 is connected to the terminal 70 at the junction of the resistor 59 and capacitor 60. The terminal 70 is connected by a conductor 71 to the junction between the rectifiers 30 and 31. The pulse transformer 66 has a secondary 73 with a load resistor 74 connected thereacross. A conductor 75 connects the lower end of the load resistor 74 to the gate 16 of the controlled rectifier 15 and conductor 76 connects the upper end of load resistor 74 to the cathode 17 of this controlled rectifier 15.

Operation

The clutch energization circuit 12 is a means to provide variable energization to the eddy current clutch field coil 21 and this variable energization provides variable speed of the mechanical load 24 directly in accordance with this energization. The control circuit 28 controls the controlled rectifier 15. Assuming steady state conditions, a particular reference voltage 41 is selected from the potentiometer 40. This reference voltage might be ten volts for example, for a medium speed of load 24. At this steady state medium speed condition the speed feedback 48 supplies a feedback voltage across the feedback impedance 47 which is less than the reference voltage. This feedback voltage might be 8.95 volts for example. Accordingly, an error signal of 1.05 volts will exist between conductor 37 and terminal 52, with this error signal positive on conductor 37. This error signal is applied as a control voltage to the amplifying circuit which includes the transistor 53. This 1.05 volts of control voltage causes conduction of the transistor 53 with current flow through the resistor 55. Such current flow biases the second transistor 57 into a conducting state and transistor output current flows downwardly through the resistor 59 to charge the capacitor 60. This capacitor 60 is charged starting with each positive half cycle on the controlled rectifier 15. FIGURE 2 shows a voltage wave 80 which has a positive half cycle 81 and a negative half cycle 82. During the negative half cycle the energization circuit 12 is not conducting, however, during these negative half cycles, the rectifiers 30 and 31 are conducting and, accordingly, the forward voltage drop across rectifier 30 clamps the voltage of the capacitor 60 to this forward voltage drop. Diode rectifiers commercially available have a forward voltage drop of about one-half volt and, accordingly, FIGURE 2 shows the voltage 83 across the capacitor 60 during the negative half cycles.

On the positive half cycles of voltage applied to the energization circuit 12 and the control circuit 28, the rectifiers 30 and 31 are non-conducting. Accordingly, the voltage across the rectifier 30 and across the capacitor 60 may rise. The voltage across capacitor 60 rises during the positive half cycles by being charged in accordance with the output current of the transistor 57. FIGURE 2 shows the curve of voltage 84 across the capacitor 60 on the positive half cycles. At some point in time the capacitor 60 will charge to a point which will cause firing of the unijunction transistor 63. This is indicated by the vertical portion 85 on FIGURE 2. The sends a pulse through the pulse transformer 66 to trigger the controlled rectifier 15. Accordingly, the clutch field coil 21 is energized sufficiently to establish the aforesaid steady state conditions.

If the reference voltage is decreased by clockwise rotation of the potentiometer blade 40, this decreases the error signal decreasing the gain of the transistors 53 and 57 and decreasing the charge rate of the capacitor 60. This might be as shown on curve 86 of FIGURE 2 for a firing point 87. Since the firing pulse supplied to the controlled rectifier 15 is later in the half cycle, the energization to the clutch field coil 21 is reduced and the speed feedback is reduced to a point establishing the new steady state conditions.

A maximum speed condition of the eddy current clutch 20 is obtained with full load energization of field coil 21, which may be obtained by increasing the reference voltage. This may give a charging voltage of capacitor 60 as shown in curve 88 of FIGURE 2, and a firing point as shown by the vertical portion 89 of the curve. This, as shown, may be only about half of the maximum potential current possible to be passed by the controlled rectifier 15, but this permits a high gain circuit capable of forcing current on acceleration through the field coil 21, yet without damage to the coil 21 or the controlled rectifier 15 because of the current limit circuit 11.

The transistors 53 and 57 provide a high gain system with only micro-amperes such as 100 micro-amperes flowing through the loop circuit including the feedback impedance 47. This high gain permits this small control current to control the clutch field coil. Some typical values may be that the eddy current clutch 20 is capable of transmitting a fifteen horsepower load with 24 volts and a maximum of fifteen amperes full load supplied to the clutch field coil 21. By way of example of circuit values but not to be construed as limiting the invention, it has been found that the reference voltage may vary from one to twenty volts with the feedback voltage varying from zero to 19 volts, maintaining about one volt lesser amplitude. Because of the high gain of the transistors 53 and 57, about 1.0 volt of error signal between conductor 37 and terminal 52 establishes a minimum output to clutch field coil 21, and 1.1 volts error signal supplies full load current to the clutch field coil 21. A current limit impedance 43 of a value of .2 ohm may be used with the movable blade 44 set near the mid-point to use .075 ohm of this resistor 43 to develop the current limit voltage signal. If, for example, the current limit point is set at 33% overload, this will be 20 amperes for the above example and this will give a 1.5 volt current limit voltage signal at which the diodes 45 begin to conduct. These diodes 45 will conduct when the voltage applied thereto from the loop circuit of the current limit circuit 11 is sufficiently high. As stated above, diode rectifiers currently available commercially have about .5 volt forward drop. Accordingly, when the error signal plus the current limit voltage signal exceed 2.5 volts, the diode rectifiers 45 will conduct. This causes current flow around the current limit loop circuit 11. This will increase the voltage drop across the feedback impedance 47 but will decrease the voltage drop across the reference voltage 41. Accordingly, the impedance of the feedback impedance 47 plus resistor 46 should exceed the impedance of the reference voltage 41. A ratio of five to one or ten to one is satisfactory and will make a more sensitive circuit the higher the ratio. Thus, as these diode rectifiers 45 conduct, they will limit the magnitude of the error signal and thus limit the maximum energization supplied by the controlled rectifier 15. Thus, the current limit circuit 11 protects not only the clutch field coil 21 but the controlled rectifier 15 as well.

One or more diode rectifiers 45 may be used in the current limit loop circuit 11. Five such diode rectifiers 45 have been shown which give about 2.5 volts forward voltage drop. The choice of the number of diode rectifiers to be used is dependent upon circuit considerations.

In this case, it was desired to have 1.5 volts of current limit signal from the resistor 43 before the current limit action took place. Additionally, under minimum load conditions, there is about a 1.0 volt drop between conductor 37 and terminal 52. This is determined by the forward bias or voltage drop through the two transistors 53 and 57 in series. Each has about .5 volt drop from emitter to base for a total of about 1.0 volt. Accordingly, this 1.0 volt plus the 1.5 volts of current limit signal determine the 2.5 volts which is essentially a bias which must be held off by the series connected diodes 45 and, hence, five such diodes are called for in the example given above. If a larger current limit voltage signal is used, more diode rectifiers would be needed. Since only a very small current flows in this loop circuit 11, quite small diode rectifiers may be used which are economical. If a different form of amplifying circuit is used, for example vacuum tubes, then a smaller amount of bias than the 1.0 volts may be encountered and, accordingly, a lesser number of diode rectifiers 45 will be needed.

The voltages in the loop circuit 11 are direct current voltages and they are algebraically added around this loop circuit to determine the voltage applied to the diode rectifiers 45. Also, a portion of the voltage in this loop circuit 11 is used as an error signal, namely, the portion between conductor 37 and terminal 52. When sufficient voltage is applied to the series connected diodes 45 so that they conduct, then the current flow through the impedances 46 and 47 is in a direction to add to the feedback voltage and this limits the magnitude of the error signal. In a sense, therefore, this flow of current through diode rectifiers 45 makes up for any loss of feedback voltage.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A control circuit comprising in combination, a load coil,
   means to establish a feedback voltage,
   means connected to variably energize said coil in accordance with said feedback voltage,
   means to establish a current limit voltage signal in accordance with the energization of said load coil,
   at least one diode rectifier,
   loop circuit means connecting said control voltage and current limit voltage signal in series with said diode rectifier with said diode rectifier being poled to conduct current in a direction for a voltage drop additive to said feedback voltage,
   and said diode rectifier conducting upon the voltage applied thereto from said loop circuit means exceeding the forward voltage drop of said diode rectifier to cause current flow through said loop circuit means to effectively increase said feedback voltage and thus limit the energization to said coil.

2. A dynamoelectric machine control circuit comprising in combination, a coil on said machine,
   means connected to variably energize said coil,
   means effectively in series with the energization to said coil developing a current limit voltage signal,
   means to establish reference voltage,
   means to increase the energization of said coil upon decreased reference voltage,
   at least one diode rectifier,
   loop circuit means connecting said reference voltage and current limit voltage signal in series with said diode rectifier with said diode rectifier being poled to conduct current in a direction for a voltage drop opposing said reference voltage,
   and said diode rectifier conducting upon the voltage applied thereto from said loop circuit means exceeding the forward voltage drop of said diode rectifier to cause current flow through said loop circuit means to effectively decrease said reference voltage and thus limit the energization to said coil.

3. An eddy current clutch control circuit comprising in combination, a clutch field coil,
   means connected to variably energize said field coil,
   means effectively in series with said field coil developing a current limit voltage signal,
   means to establish a feedback voltage proportional to an output condition of the eddy current clutch,
   a plurality of diode rectifiers connected in series,
   loop circuit means connecting said feedback voltage and current limit voltage signal in series with said series connected diode rectifiers with said diode rectifiers being poled to conduct current in a direction for a voltage drop additive to said feedback voltage,
   and said plurality of series connected diode rectifiers conducting upon the voltage applied thereto from said loop circuit means exceeding the forward voltage drop of said diode rectifiers to cause current flow through said loop circuit means to effectively increase said feedback voltage.

4. An eddy current clutch control circuit comprising in combination, a clutch field coil,
   a current limit impedance connected in series with said field coil for developing a current limit voltage signal,
   means connected to variably energize said field coil through said impedance,
   D.C. reference voltage means,
   a plurality of diode rectifiers connected in series,
   loop circuit means connecting said reference voltage and current limit voltage signal in series with said series connected diode rectifiers with said diode rectifiers being poled to conduct current in a direction for a voltage drop opposing said reference voltage,
   control means to decrease the energization to said clutch field coil upon decreased reference voltage,
   and said plurality of series connected diode rectifiers conducting upon the voltage applied thereto from said loop circuit means exceeding the forward voltage drop of said diode rectifiers to cause current flow through said loop circuit means to effectively decrease said reference voltage and thus limit the energization to said eddy current clutch coil.

5. An eddy current clutch control circuit comprising in combination, a clutch field coil,
   a current limit impedance connected in series with said field coil for developing a current limit voltage signal,
   means connected to variably energize said field coil through said impedance,
   feedback means from the output of said eddy current clutch establishing a feedback voltage proportional to an output condition thereof,
   a plurality of diode rectifiers connected in series,
   loop circuit means connecting said feedback voltage and current limit voltage signal in series with said series connected diode rectifiers with said diode rectifiers being poled to conduct current in a direction additive to said feedback voltage,
   control means to decrease the energization to said clutch field coil upon increased feedback voltage,
   and said plurality of series connected diode rectifiers conducting upon the voltage applied thereto from said loop circuit means exceeding the forward voltage drop of said diode rectifiers to cause current flow through said loop circuit means to effectively increase said feedback voltage to thus limit the energization to said eddy current clutch coil.

6. An eddy current clutch control circuit comprising in combination, a clutch field coil,
   a current limit impedance connected in series with said field coil for developing a current limit voltage signal,
means connected to variably energize said field coil through said impedance,
D.C. reference voltage means,
feedback means from the output of said eddy current clutch establishing a feedback voltage proportional to an output condition thereof,
means connecting together said reference and feedback voltages to develop an error signal,
a plurality of diode rectifiers connected in series,
first circuit means connecting said error signal and current limit voltage signal in series with said series connected diode rectifiers with said diode rectifiers being poled to conduct current in a direction additive to said feedback voltage,
means to increase the energization to said clutch field coil upon increased error signal,
and said plurality of series connected diode rectifiers conducting upon the voltage of said current limit voltage signal plus said error signal exceeding the forward voltage drop of said diode rectifiers to cause current flow therethrough to limit the magnitude of said error signal and thus limit the energization to said eddy current clutch coil.

7. An eddy current clutch control circuit comprising in combination, a clutch field coil,
a current limit impedance connected in series with said field coil for developing a current limit voltage signal,
means connected to variably energize said field coil through said impedance,
D.C. reference voltage means,
second impedance means,
feedback means from the output of said eddy current clutch establishing a feedback voltage proportional to the speed thereof across at least a portion of said second impedance means,
means connecting together said reference voltage and said second impedance to develop an error signal,
a plurality of diode rectifiers connected in series,
first circuit means connecting said error signal and current limit voltage signal in series with said series connected diode rectifiers with said diode rectifiers being poled to conduct current through said second impedance means in a direction additive to said feedback voltage,
means to increase the energization to said clutch field coil upon increased error signal,
said second impedance means exceeding the impedance of said D.C. reference voltage means,
and said plurality of series connected diode rectifiers conducting upon the voltage of said current limit voltage signal plus said error signal exceeding the forward voltage drop of said diode rectifiers to cause current flow through said second impedance means to increase the voltage thereacross and thus limit the energization to said eddy current clutch coil.

8. An eddy current clutch control circuit comprising in combination, a clutch field coil,
a current limit impedance connected in series with said field coil for developing a current limit voltage signal,
means connected to variably energize said field coil through said impedance,
D.C. reference voltage means,
second impedance means,
feedback means from the output of said eddy current clutch establishing a feedback voltage proportional to the speed thereof across at least a portion of said second impedance means,
said reference voltage and said second impedance means having positive and negative terminals and with said negative terminals being connected together to develop an error signal at the positive terminals thereof,
a plurality of diode rectifiers connected in series,
first circuit means connecting said reference voltage and current limit voltage signal in series with said series connected diode rectifiers and said second impedance means,
said diode rectifiers being poled to conduct current from the positive terminal of said current limit voltage signal to the positive terminal of said feedback voltage,
said reference voltage normally exceeding said feedback voltage,
means to increase the energization to said clutch field coil upon increased error signal,
said second impedance means exceeding the impedance of said D.C. reference voltage means,
and said plurality of series connected diode rectifiers conducting upon the voltage of said current limit voltage signal plus said error signal exceeding the forward voltage drop of said diode rectifiers to cause current flow through said second impedance means to increase the positive voltage at said positive terminal thereof to limit the magnitude of said error signal and thus limit the energization to said eddy current clutch coil.

9. An eddy current clutch control circuit comprising in combination, a clutch field coil,
a current limit impedance connected in series with said field coil for developing a current limit voltage signal,
controlled rectifier means connected to energize said field coil through said impedance,
D.C. reference voltage means,
a feedback impedance,
feedback means from the output of said eddy current clutch establishing a feedback voltage proportional to the speed thereof across said feedback impedance,
said reference and feedback voltages having positive and negative terminals and with said negative terminals being connected together to develop an error signal at the positive terminals thereof,
a plurality of diode rectifiers connected in series,
first circuit means connecting said reference voltage and current limit impedance in series with said series connected diode rectifiers and said feedback impedance,
said diode rectifiers being pole to conduct current from the positive terminal of said current limit impedance to the positive terminal of said feedback voltage,
said reference voltage normally exceeding said feedback voltage,
means to increase the output of said controlled rectifier means upon increased error signal,
said feedback impedance exceeding the impedance of said D.C. reference voltage means,
and said plurality of series connected diode rectifiers conducting upon the voltage of said current limit voltage signal plus said error signal exceeding the forward voltage drop of said diode rectifiers to cause current flow through said feedback impedance to increase the positive voltage at said positive terminal thereof to limit the magnitude of said error signal and thus limit the current conducted by said controlled rectifier means to said eddy current clutch coil.

10. An eddy current clutch control circuit comprising in combination, a clutch field coil,
a current limit impedance connected in series with said field coil,
controlled rectifier means connected to energize said field coil through said impedance,
D.C. reference voltage means,
a feedback impedance,
feedback means from the output of said eddy current clutch establishing a voltage proportional to the speed thereof across said feedback impedance,
said reference and feedback voltages having positive and negative terminals and with said negative terminals being connected together to develop an error signal at the positive terminals thereof, a plurality of diode rectifiers connected in series, first circuit means connecting said reference voltage and current limit impedance in series with said series connected diode rectifiers and said feedback impedance, said diode rectifiers being poled to conduct current from the positive terminal of said current limit impedance to the positive terminal of said feedback voltage, said reference voltage normally exceeding said feedback voltage, amplifier means having an input connected to said error signal to increase the amplifier output upon increase of said error signal, means to increase the output of said controlled rectifier means upon increased amplifier output, said feedback impedance exceeding the impedance of said D.C. reference voltage means, and said plurality of series connected diode rectifiers conducting upon the voltage of said current limit voltage signal plus said error signal exceeding the forward voltage drop of said diode rectifiers to cause current flow through said feedback impedance to increase the positive voltage at said positive terminal thereof to decrease the gain of said amplifier and thus limit the current conducted by said controlled rectifier means to said eddy current clutch coil.

11. An eddy current clutch control circuit comprising in combination, a clutch field coil, a current limit resistor connected in series with said field coil, a semiconductor controlled rectifier connected in series with said field coil and resistor, means to energize said field coil and resistor through said rectifier, a back rectifier connected across the series combination of said field coil and resistor and poled in opposition to said controlled rectifier relative to said energization means, a D.C. supply voltage source, means to obtain a D.C. reference voltage from said supply voltage source, a feedback impedance, feedback means from the output of said eddy current clutch establishing a voltage proportional to the speed thereof across said feedback impedance, said reference and feedback voltages having positive and negative terminals and with said negative terminals being connected together to develop an error signal at the positive terminals thereof, first circuit means connecting in series said reference voltage and a current limit voltage signal from said current limit resistor with said voltages being of additive polarity, second circuit means including five diode rectifiers connected in series and poled to conduct current from the positive terminal of said current limit resistor to the positive terminal of said feedback voltage, said reference voltage normally exceeding said feedback voltage, amplifier means having an input connected to said error signal to increase the amplifier output upon increase of said error signal, a firing circuit for said controlled rectifier controlled by said amplifier to increase the output of said controlled rectifier upon increased amplifier output, the impedance of said feedback impedance exceeding the impedance of said D.C. reference voltage means, and said five diode rectifiers conducting upon the voltage of said current limit voltage signal plus said error signal exceeding the forward voltage drop of said five diode rectifiers to cause current flow through said feedback impedance to increase the positive voltage at said positive terminal thereof to decrease the gain of said amplifier and thus limit the current conducted by said controlled rectifier to said eddy current clutch coil.

12. An eddy current clutch control circuit comprising in combination, a clutch field coil, a current limit resistor connected in series with said field coil, a silicon controlled rectifier connected in series with said field coil and resistor, an energizing transformer secondary connected to energize said field coil and resistor through said rectifier, a back rectifier connected across the series combination of said field coil and resistor and poled in opposition to said silicon controlled rectifier relative to said source, a D.C. supply voltage source, potentiometer means to obtain a D.C. reference voltage from said supply voltage source, means establishing a feedback impedance, means establishing a feedback voltage across said feedback impedance proportional to speed of the output of said eddy current clutch, said reference and feedback voltages having positive and negative terminals and with said negative terminals being connected together, first circuit means connecting in series said reference voltage and current limit voltage signal from said current limit resistor with said voltages being of additive polarity, second circuit means including five diode rectifiers connected in series and poled to conduct current from the positive terminal of said current limit resistor to the positive terminal of said feedback voltage, said reference voltage normally exceeding said feedback voltage, amplifier means having an input connected to the series combination of said reference voltage and said feedback voltage to increase the amplifier output upon decrease of feedback voltage, a firing circuit for said silicon controlled rectifier controlled by said amplifier to increase the output of said controlled rectifier upon increased amplifier output, said feedback impedance exceeding the impedance of said potentiometer, and said five diode rectifiers conducting upon the voltage of said current limit voltage signal plus said reference voltage exceeding the sum of said feedback voltage and the forward voltage drop of said five diode rectifiers to cause current flow through said feedback voltage impedance to increase the positive voltage at said positive terminal thereof to decrease the gain of said amplifier and thus limit the current conducted to said silicon controlled rectifier to said eddy current clutch coil.

References Cited by the Examiner
UNITED STATES PATENTS
2,888,633   5/1959   Carter _____ 317—33 X MILTON O. HIRSHFIELD, *Primary Examiner.*

DAVID X. SLINEY, *Examiner.*